Figure 1:
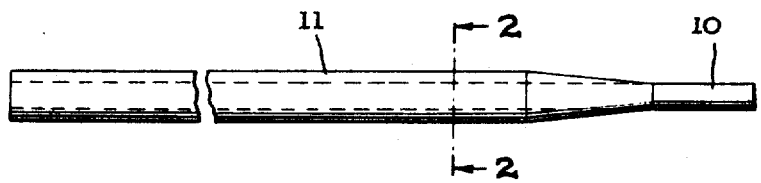

INVENTORS
ELIS ERIK VILHELM HELIN
ERIK JEPPE MAGNUS MAGNUSSON

United States Patent Office 2,876,151
Patented Mar. 3, 1959

2,876,151
FLUX COMPOSITION AND ITS METHOD OF PRODUCTION

Elis Erik Vilhelm Helin and Erik Magnusson, Goteborg, Sweden, assignors to Elektriska Svetsningsaktiebolaget, Goteborg, Sweden, a corporation of Sweden Application July 6, 1956, Serial No. 596,143

Claims priority, application Sweden July 9, 1955

5 Claims. (Cl. 148—26)

The present invention relates to the manufacture of coated electrodes for electric arc welding. The coating compositions employed for such electrodes usually contain, in addition to slag-forming agents and sometimes gas-forming agents, additions of deoxidants or alloying agents, usually in the form of powdered ferro alloys. It has been suggested to produce such powder directly from molten ferro alloy by granulating or spraying or otherwise disintegrating the molten metal into immediately solidifying grains or particles of suitable size.

It is also well known to employ powdered sponge iron or other soft iron as a constituent of electrode coatings, for instance in order to improve the handling characteristics of the electrode or to impart to the electrode coating some degree of electric conductivity facilitating starting of the arc. It is of course possible to produce iron powder by the method of spraying or otherwise subdividing molten iron. Experience has shown, however, that iron powder produced in this manner will contain a substantial proportion of iron oxide, the oxide content increasing as particle size is decreased. The oxide content corresponds to a loss of metallic iron. Morover, the iron oxide is metallurgically undesirable in many coating types. While the oxide may be converted back into metallic iron by heat treatment of the powder under reducing conditions, such heat treatment will considerably increase the price of the product.

The present invention is based on the new discovery that the oxidation occurring on disintegration of molten iron under oxidizing conditions will be largely suppressed, if the molten iron contains a sufficient addition of either or both of the easily oxidizable elements silicon and alumimium. This unexpected result can be explained by the assumption that part of the silicon or aluminium present in each particle will be oxidized very rapidly and form a surface or film of oxide able to effectively prevent further oxidization.

The invention in its most general aspect consists in a new method for the manufacture of coated electrodes for electric arc welding, comprising the steps of producing a molten body of a low carbon alloy having iron as its predominating constituent and containing a deoxidant chosen from the group consisting of silicon and aluminium, the proportion of said deoxidant being substantially in excess over the amount required for deoxidizing said molten body, subjecting said molten body to a subdivision process under oxidizing conditions to as to produce a powder of metallic particles, mixing said powder with slag-forming components and a binder, and applying the resulting compound as a coating on electrode cores of iron or steel.

The expression "low carbon" above employed should be understood to indicate that the carbon content must not exceed 0.25%. Subdivision of the molten alloy is preferably carried out in known manner by subjecting a jet of the molten alloy to the action of a powerful blast of a suitable agent, for instance water, steam or compressed air, ejected through an annular nozzle disposed concentrically to the liquid metal jet. The powder formed is received by a vat filled with water or some other suitable liquid.

The invention is chiefly concerned with alloys containing not less than 75% iron. By suitable choice of the conditions during the subdivision process it is possible to obtain a powder with any desired grain fineness, so that subsequent additional subdivision in a grinding mill or the like will be superfluous. Preferably conditions should be so chosen that at least 50% by weight of the particles will pass through a standard 30 mesh screen. As a rule, the product obtained will contain a proportion of comparatively coarse particles, which are suitably removed by sieving and remelted. It has been found, however, that the use of silicon or aluminium as alloying additions in the proportions within the invention has the additional effect of considerably reducing the proportion of over-sized particles formed in the liquid subdivision process.

It will not be necessary to remove the thin coating of oxide present on the powder particles. On the contrary, said coating may have the advantageous effect of preventing the reaction between the binder (water glass) solution and the iron powder which otherwise may cause difficulties in the electrode manufacture. The invention comprises, however, also the possibility of subjecting the iron powder to a chemical or preferably mechanical treatment for removing the oxide coating before employing the iron powder as a constituent of the coating compound.

The required amount of silicon and/or aluminium is preferably added to the molten iron shortly before the subdivision process, in order to avoid unnecessary losses of said deoxidants. The quantity required to be added varies with the oxide content of the molten body and with the type of subdivision agent employed as well as with other factors and is suitably determined by direct tests with each individual type of alloy. In such tests, the colour of the powder obtained may be a useful aid in determining the correct amount of silicon or aluminium to be added, a sufficient proportion thereof resulting in a light, metallic colour instead of the usual dark oxide colour. According to an approximate rule believed to be valid for the majority of practical cases, the content of silicon and/or aluminium of the powder should be such that the sum of the silicon content and thrice the aluminium content is not less than 1.5%. If silicon alone or aluminium alone are used, the silicon content therefore should be at least 1.5% and the aluminium content at least 0.5%.

In order to give some idea of the result obtained through the invention, results are given below of oxygen determinations for powders obtained by subdividing liquid iron without silicon and with varying silicon additions by means of the water jet process.

| Silicon in powder, percent by weight | Oxygen in powder, percent by weight |
| --- | --- |
| 0 | 1.5 |
| 1.6 | 0.60 |
| 2.3 | 0.23 |

As evident from the above figures, the content of 1.5% Si stated as a minimum by the approximate rule above given will result in a substantial decrease of the oxide content of the powder. In the practical carrying out of the invention it is, however, recommended to choose a silicon content of at least about 3% (apart from cases in which the character of the desired weld deposit demands a particularly low silicon content of the coating). Increasing the silicon content of the powder beyond about 5% will not result in any substantial further decrease of the oxide content of the powder. It is within the invention, however, to add still higher proportions of silicon, for instance resulting in a silicon content of 12 to 15%. Such high-silicon powder may be used in the manufacture of electrodes for depositing silicon steel.

If aluminium alone is employed, the quantity thereof should suitably be chosen so as to result in a content of aluminium between 1 and 3% of the weight of the powder. Aluminium contents in excess of 5% are believed to have no practical importance.

In the choice of the content of silicon or aluminium in the molten alloy used for producing the powder, due regard should of course be taken to the general character of the electrode coatings of which the powder is to form a part. For electrodes of a type in which silicon or aluminium are not required as alloying additions or as deoxidants in the welding process, for instance certain electrodes of the iron oxide type, the addition of silicon or aluminium in the method according to the invention may be kept comparatively low. In the case of electrodes for which it is necessary to employ silicon as a deoxidizing constituent of the coating, it is preferable to supply all of the silicon required for said purpose in the form of a constitutent of the iron powder alloy, so that the addition of powdered ferrosilicon in the coating otherwise necessary will be superfluous.

Welding electrode coatings often contain some manganese (in the form of ferromanganese) as a deoxidant and for other purposes. In the method according to the invention, it is advantageous to introduce also the required quantity of manganese as a constituent of the iron powder, so that all of the metal to be present in the electrode coating is supplied in the from of a powdered, homogenenous alloy of iron, manganese and silicon and/or aluminium. In some cases, a manganese content of 1% by weight of the powder will be sufficient. Contents between 2 and 10 or at most 15% may be considered to be normal.

Similarly, other metals which are to be present in the electrode coating for the purpose of deoxidizing or refining the weld metal or modifying the composition of the welding deposit or compensating the welding losses of alloying constituents of the core, may be supplied to the coating in the form of additional alloying constituents of the iron powder. Examples of such metals are chromium, nickel, cobalt, tungsten, molybdenum, vanadium, titanium, niobium and zirkonium. The aggregate content of these further additions should, however, not exceed 10%, as higher contents may cause complications in the manufacture of the alloyed iron powder.

The invention is of particular importance for, but is not limited to, the manufacture of such electrodes in which the iron powder present in the coating forms a great part, for instance one third or more, of the weight of metal present in the electrode (core and coating).

The invention also particularly comprises an arc welding electrode having a core of iron or steel and a coating containing, in addition to slag-forming agents and a binder, a substantial amount of a powdered iron alloy containing an element selected from the group comprising silicon and aluminium, the iron content of the alloy being not less than 75% and the sum of the silicon content and thrice the aluminium content being not less than 1.5% and not higher than 15%, said powdered iron alloy having the characteristics of a powder formed by a solidified spray of liquid metal.

Figure 2:
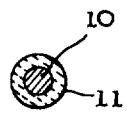

In the accompanying drawing Fig. 1 is a side view of a coated electrode in accordance with an embodiment of the present invention; and Fig. 2 is a sectional view of the electrode of Fig. 1 on the line 2—2 thereof.

In these figures the core is indicated at 10 and the coating is shown at 11.

Three examples of the process according to the invention are stated below.

*Example 1*

A charge of 50 kilogrammes steel scrap having an average carbon content of about 0.2% and with sulphur and phosphorus contents lower than 0.07% is melted in a high frequency furnace. To the melted charge are added 3.5 kilogrammes ferrosilicon (about 50% Si) and 1.5 kilogrammes refined ferromanganese (80% Mn). The molten metal is poured into a preheated conical refractory container provided with a bottom nozzle through which the metal escapes as a jet which is subdivided into a spray by means of a water jet ejected from a ring nozzle disposed concentrically to the metal jet. After drying of the powder obtained, the over-sized grains are removed by passing the powder through a 30 mesh screen. The resulting product is mixed with powdered limestone and fluorspar in the following proportions:

|   | Percent |
|---|---|
| Iron powder | 65 |
| Limestone | 18 |
| Fluorspar | 17 |
|   | 100 |

After the addition of potassium silicate solution in the proportion required to render the composition extrudable, the composition is applied to mild steel (about 0.08% C) core wires of 3.25 mm. diameter by extrusion through a nozzle of 7 mm. diameter.

*Example 2*

An alloyed iron powder is produced as described in the foregoing example with the modification that the quantity of ferromanganese is increased to 6.5 kilogrammes. With this iron powder, the following coating composition is prepared:

|   | Percent |
|---|---|
| Iron powder | 80 |
| Precipitated silica | 5 |
| Hausmannite | 4 |
| Rutile | 4 |
| Bentonite | 7 |
|   | 100 |

The resulting compound is mixed with sodium silicate solution in the proportion required for extrudability, and is applied to mild steel core wires of 3.25 mm. diameter by extrusion through a nozzle of 7.5 mm. diameter.

*Example 3*

An alloyed iron powder is produced as described in Example 1 with the modification that the proportion of ferrosilicon is increased to 10 kilogrammes and no ferromanganese is added. The iron powder obtained is mixed with limestone, fluorspar and china clay into the following proportions:

|   | Percent |
|---|---|
| Iron powder | 42.5 |
| Limestone | 32.5 |
| Fluorspar | 17.5 |
| China clay | 7.5 |
|   | 100.0 |

After addition of the required proportion of sodium silicate solution, the resulting paste is applied to mild steel core wires of 3.25 mm. diameter by extrusion through a nozzle of 5.2 mm. diameter.

We claim:

1. A process for manufacturing a coating composition suitable for coating electrode cores of iron and steel for electric arc welding, comprising the steps of producing a molten alloy of low carbon steel containing not less than 75% of iron and containing a deoxidant selected from the group consisting of silicon and aluminium the sum of the silicon content and thrice the aluminium content amounting to at least 1.5% and not more than 15% by weight, subjecting said molten alloy to a subdivision process under oxidizing conditions so as to produce a powder of metallic particles, and mixing said powder with slag-forming constituents and a binder.

2. A process for manufacturing a coating composition suitable for coating electrode cores of iron and steel for electric arc welding, comprising the steps of producing a molten alloy of low carbon steel containing not less than 75% of iron and containing a deoxidant selected from the group consisting of silicon and aluminium the sum of the silicon content and thrice the aluminium content amounting to at least 1.5% and not more than 15% by weight, subjecting said molten alloy to a subdivision process under oxidizing conditions so as to produce a powder of metallic particles of such fineness that at least 50% by weight of the particles will pass through a standard 30 mesh screen, and mixing said powder with slag-forming constituents and a binder.

3. A process as claimed in claim 1 in which the molten alloy contains not less than 1% of manganese.

4. A process as claimed in claim 1 in which the aggregate content of iron, silicon, aluminium and manganese amounts to not less than 90% by weight of the molten alloy.

5. An arc welding electrode having a core of iron or steel and a coating containing, in addition to slag-forming agents and a binder, a substantial amount of a powdered iron alloy containing at least one element selected from the group comprising silicon and aluminium, the iron content of the alloy being not less than 75% and the sum of the silicon content and thrice the aluminium content being not less than 1.5% and not higher than 15%, said powdered iron alloy having the characteristics of a powder formed by a solidified spray of liquid metal.

References Cited in the file of this patent

UNITED STATES PATENTS

| | | |
|---|---|---|
| 1,902,948 | Castle | Mar. 28, 1933 |
| 1,905,648 | Notvest | Apr. 25, 1933 |
| 1,967,491 | Austin | July 24, 1934 |
| 2,009,240 | Roberts et al. | July 23, 1935 |

FOREIGN PATENTS

| | | |
|---|---|---|
| 17,046 | Great Britain | 1913 |

UNITED STATES PATENT OFFICE
CERTIFICATE OF CORRECTION

Patent No. 2,876,151                                                            March 3, 1959

Elis Erik Vilhelm Helin et al.

It it hereby certified that error appears in the above numbered patent requiring correction and that the said Letters Patent should read as corrected below.

In the grant, line 1, and in the heading to the printed specification, line 4, name of second inventor, for "Erik Magnusson" read -- Erik Jeppe Magnus Magnusson --; in the grant, line 12, and in the heading to the printed specification, line 5, name of assignee, for "Elektriska Svetsingsaktiebolaget" read -- Elektriska Svetsningsaktiebolaget --; column 1, line 36, for "Morover" read -- Moreover --; line 43, for "oxidation" read -- oxidization --; lines 45 and 46, for "alumimium" read -- aluminium --; line 61, for "to", first occurrence, read -- so --; column 3, line 33, for "constitutent" read "constituent --; line 35, for "from" read -- form --; line 36, for "homogenenous" read -- homogenous --; column 4, line 30, for "extrustion" read -- extrusion --.

(SEAL)     Signed and sealed this 18th day of August 1959.
Attest:

KARL H. AXLINE
   Attesting Officer                                                  ROBERT C. WATSON
                                                                                 Commissioner of Patents